US011181355B2

(12) United States Patent
Xu et al.

(10) Patent No.: US 11,181,355 B2
(45) Date of Patent: Nov. 23, 2021

(54) ON-LINE AUTOMATIC DETECTION DEVICE FOR WHEEL BRAKE SPACE

(71) Applicant: CITIC Dicastal CO., LTD, Qinhuangdao (CN)

(72) Inventors: Zuo Xu, Qinhuangdao (CN); Bowen Xue, Qinhuangdao (CN); Xinhan Liu, Qinhuangdao (CN); Baojun Cui, Qinhuangdao (CN); Jiandong Guo, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 387 days.

(21) Appl. No.: 16/384,332

(22) Filed: Apr. 15, 2019

(65) Prior Publication Data

US 2020/0003539 A1     Jan. 2, 2020

(30) Foreign Application Priority Data

Jul. 2, 2018    (CN) .......................... 201810704577.9

(51) Int. Cl.
*G01B 5/00*        (2006.01)
(52) U.S. Cl.
CPC .................................. *G01B 5/0028* (2013.01)
(58) Field of Classification Search
CPC ... G01B 5/0028; B60T 17/221; G01M 17/013
USPC ......................................................... 33/609
See application file for complete search history.

(56) References Cited

U.S. PATENT DOCUMENTS

| 11,047,668 | B2 * | 6/2021 | Xu | ...................... G01M 17/013 |
| 11,105,606 | B2 * | 8/2021 | Xu | ...................... G01B 5/0025 |
| 2020/0003539 | A1 * | 1/2020 | Xue | ...................... B60T 17/221 |
| 2020/0141710 | A1 * | 5/2020 | Liu | ......................... G01B 21/16 |
| 2020/0141711 | A1 * | 5/2020 | Liu | ..................... G01M 17/013 |
| 2020/0191544 | A1 * | 6/2020 | Xue | .......................... G01B 5/14 |

FOREIGN PATENT DOCUMENTS

| CN | 104828527 | A |   | 8/2015  |                 |
| CN | 106964579 | A |   | 7/2017  |                 |
| CN | 107356192 | A |   | 11/2017 |                 |
| CN | 108663221 | A | * | 10/2018 | ......... G01B 5/0028 |
| CN | 109297727 | A | * | 2/2019  | ......... G01M 17/013 |
| EP |   3647717 | A1 | * | 5/2020 | ......... G01B 5/0004 |
| EP |   3647718 | A1 | * | 5/2020 | ............... G01B 3/12 |

* cited by examiner

*Primary Examiner* — Yaritza Guadalupe-McCall
(74) *Attorney, Agent, or Firm* — Calfee, Halter & Griswold LLP

(57) ABSTRACT

The present application relates to an on-line automatic detection device for wheel brake space, which is composed of a lower lifting drive system, a detection system, a synchronous clamping drive system and an upper driving and pressing system. In use, the device may not only detect the brake space of the back cavity of the wheel, but also detect the specific value of the interference amount of the brake space. Moreover, it has the characteristics of high automation, powerful function, advanced technology, strong versatility, and safe and stable performance.

1 Claim, 3 Drawing Sheets

ON-LINE AUTOMATIC DETECTION DEVICE FOR WHEEL BRAKE SPACE

CROSS-REFERENCE TO RELATED APPLICATIONS

This application claims priority to Chinese Patent Application No. 201810704577.9 filed on Jul. 2, 2018, which is hereby incorporated by reference in its entirety.

TECHNICAL FIELD

The application relates to a detection device, and specifically to an on-line automatic detection device for wheel brake space.

BACKGROUND ART

The wheel plays an important role in the automobile chassis. Not only is the wheel used to carry all the loads of the vehicle, but also in order to save space, the back cavity of the wheel must be equipped with a brake disc. During the manufacture of the wheel, the brake space of the back cavity of the wheel must be detected, otherwise the brake disc may interfere with the wheel. The traditional detection method for the brake space of the back cavity of the wheel is that one manually makes the detection by hand-holding brake checking plate, which not only has low detection efficiency, but also has large detection error. Moreover, the deviation cannot be obtained when the detection is unqualified.

SUMMARY OF THE INVENTION

The object of the present application is to provide an on-line automatic detection device for wheel brake space, which may not only detect the brake space of the back cavity of the wheel, but also detect the specific value of the interference amount of the brake space.

In order to achieve the above object, the technical solution of the present application is as follows: on-line automatic detection device for wheel brake space includes lower guiding pillars, lower guiding sleeves, a first pulley, a lower fixing plate, a lower lifting plate, a first shaft, a first bearing seat, a piston, a second shaft, a first rack, a first lower guiding rail, a first gear, a left vertical plate, a first servo motor, a left transverse plate, a second lower guiding rail, a second servo motor, a second bearing seat, a second rack, a second gear, a third shaft, a detection plate, a sensor, a counterweight block, a sealing block, a cylinder rod, expansion blocks, a third rack, a left bracket, a vertical meter, a transverse meter, a right bracket, a sliding plate, a fourth rack, a fourth gear, a third lower guiding rail, a third servo motor, a right transverse plate, a fourth servo motor, a right vertical plate, a fourth lower guiding rail, a third gear, a first cylinder, an upper fixing plate, fifth racks, an upper guiding rail, a left sliding plate, left bearing seats, left shafts, V-type rollers, a conical pressing head, a cross hinge, a fourth shaft, a third bearing seat, an upper lifting plate, upper guiding pillars, upper guiding sleeves, a second pulley, a fifth servo motor, a first synchronous belt, a third pulley, a second cylinder, a fifth gear, right shafts, right bearing seats, a right sliding plate, a sixth servo motor, a seventh servo motor, a second synchronous belt, a fourth pulley, third cylinders and a frame, etc.

The lower drive system includes: the four lower guiding sleeves are fixed below the lower fixing plate; each of the four lower guiding pillars matched with one of the lower guiding sleeves is fixed below the lower lifting plate; the two third cylinders are fixed below the lower fixing plate, output ends thereof are hinged with lower part of the lower lifting plate; the first bearing seat is fixed above the lower lifting plate; the first shaft is mounted inside the first bearing seat through a bearing; lower part of first shaft is fixed with the first pulley; the seventh servo motor is fixed on right side above the lower lifting plate, and output end thereof is fixed with the fourth pulley; and the first pulley and fourth pulley are connected by the second synchronous belt.

The detection system includes: the second shaft is mounted in the hole at upper end of first shaft through a bearing; the piston is matched with the hole on the second shaft; the cylinder rod is fixed above the piston; upper part of the cylinder rod is conical; the sealing block is fixed at upper end of second shaft; the sealing block is provided with several uniformly distributed T-type grooves; several expansion blocks are matched with T-type grooves of the sealing block; a conical surface is formed in the middle of the several expansion blocks to match with conical surface of upper part of the cylinder rod; the piston, the second shaft, the sealing block and the cylinder rod form a closed self-made cylinder; the first rack is fixed on left side of the first shaft; the left vertical plate is mounted on left side of the first shaft through the first lower guiding rail; the first servo motor is fixed on left side of the left vertical plate, and top end thereof is fixed with the first gear; the first gear is meshed with the first rack; the left transverse plate is fixed on the top of the left vertical plate; the second bearing seat is mounted on the top of the left transverse plate through the second lower guiding rail; the second rack is fixed on left side of the second bearing seat; the second servo motor is fixed below the left transverse plate, and output end thereof is fixed with the second gear; the second gear is meshed with the second rack; the third shaft is mounted inside of the second bearing seat through a bearing; the detection plate is fixed on left side of the third shaft; the sensor is fixed on right side of the second bearing seat; the counterweight block is fixed on right side of the third shaft; the right vertical plate is mounted on right side above the first shaft through the fourth lower guiding rail; the third rack is also fixed on right side of the first shaft; the fourth servo motor is fixed on right side of the right vertical plate, and output end thereof is fixed with the third gear; the third gear is meshed with third rack; the right transverse plate is fixed on upper part of the right vertical plate; the sliding plate is mounted above the right transverse plate through the third lower guiding rail; the left bracket is fixed on left side above the sliding plate; the vertical meter is fixed on the left bracket; the right bracket is fixed on right side above the sliding plate; the transverse meter is fixed on the right bracket; the fourth rack is fixed on right side of the sliding plate; the third servo motor is fixed below the right transverse plate, and output end thereof is fixed with the fourth gear; and the fourth gear is meshed with the fourth rack.

The synchronous clamping drive system includes: the fifth gear is fixed above the upper fixing plate; the left sliding plate is mounted above the upper fixing plate through the upper guiding rail; the two left bearing seats are fixed above the left sliding plate; the two left shafts are mounted inside the left bearing seat through bearings; the right sliding plate is fixed above the upper fixing plate through the upper guiding rail; the two right bearing seats are fixed above the right sliding plate; the two right shafts are mounted inside the right bearing seat through bearings; upper parts of the two left shafts and upper parts of the two right shafts are fixed with one of the V-type rollers, respectively; the sixth servo motor is fixed below the right sliding plate, and output end thereof is connected with lower part of one of the right shafts; the first cylinder is fixed above the upper fixing plate, and output end thereof is connected with the left sliding plate; lower parts of the left sliding plate and the right sliding plate are respectively fixed with one of the fifth racks, and the two fifth racks are meshed with the fifth gear at the same time.

The upper driving and pressing system includes: the four upper guiding sleeves are fixed on the top of the frame; the four upper guiding pillars matched with the upper guiding sleeves are fixed above the upper lifting plate; the second cylinder is also fixed on the top of the frame, and output end thereof is hinged with the top of the upper lifting plate; the fifth servo motor is mounted on the top of the upper lifting plate, and output end thereof is fixed with the second pulley; the third bearing seat fixed below the upper lifting plate; the fourth shaft is mounted inside the third bearing seat through a bearing; the top of the fourth shaft is fixed with the third pulley; the second pulley and the third pulley are connected by the first synchronous belt; the top of the cross hinge is fixed below the fourth shaft; and the conical pressing head is fixed below the cross hinge.

During operation, the first cylinder makes the four V-type rollers clamp the wheels synchronously through the fifth gear, the fifth racks and the upper guiding rail; the sixth servo motor makes the clamped wheels rotate; the third cylinder makes the first shaft and the expansion blocks rise through the lower guiding pillars and the lower guiding sleeves to ensure that upper end surface of the second shaft contacts with the flange disc of the wheel; the piston makes the cylinder rod move upward, resulting in the expansion blocks expand center hole of the wheel; the first cylinder makes the four V-type rollers loosen the wheel through the fifth gear, the fifth racks and the upper guiding rail; the third cylinder continually make the wheel rise through the lower guiding pillars and the lower guiding sleeves; and the second cylinder makes the conical pressing head press dead head of the wheel through the upper guiding pillars and the upper guiding sleeve, and the wheel is fully positioned.

The first servo motor precisely regulates the height of the detection plate through the first gear, the first rack and the first lower guiding rail; the second servo motor precisely regulates the horizontal position of the detection plate through the second gear, the second rack and the second lower guiding rail; the seventh servo motor drives the first shaft to rotate through the first pulley, the fourth pulley and the second synchronous belt, and also drives the detection plate to rotate, so the brake space of the back cavity of the wheel may be detected at this time. When the brake space of the back cavity of the wheel is not qualified, the detection plate will interfere with the back cavity of the wheel, and the detection plate will rotate at a certain angle to change the position of the counterweight block, so that the sensor will immediately detect the interference signal; on the condition the sensor does not generate a signal, the brake space is qualified.

When it is detected that the brake space is unqualified, the fifth servo motor rotates the fourth shaft and the conical pressing head through the first synchronous belt, and drives the wheel to rotate at the same time; the fourth servo motor may accurately regulate the heights of the transverse meter and the vertical meter through the third gear, the third rack and the fourth lower guiding rail; the third servo motor may accurately regulate the horizontal positions of the transverse meter and the vertical meter through the fourth gear, the fourth rack and the third lower guiding rail; the transverse meter and the vertical meter may detect the runout in the circumferential direction and in the axial direction of the wheel back cavity respectively, so that the specific value of the interference amount of the brake space may be more intuitively displayed.

In use, the application may not only detect the brake space of the back cavity of the wheel, but also detect the specific value of the interference amount of the brake space. At the same time, it has the characteristics of high automation, powerful function, advanced technology, strong versatility, and safe and stable performance.

Figure 1:
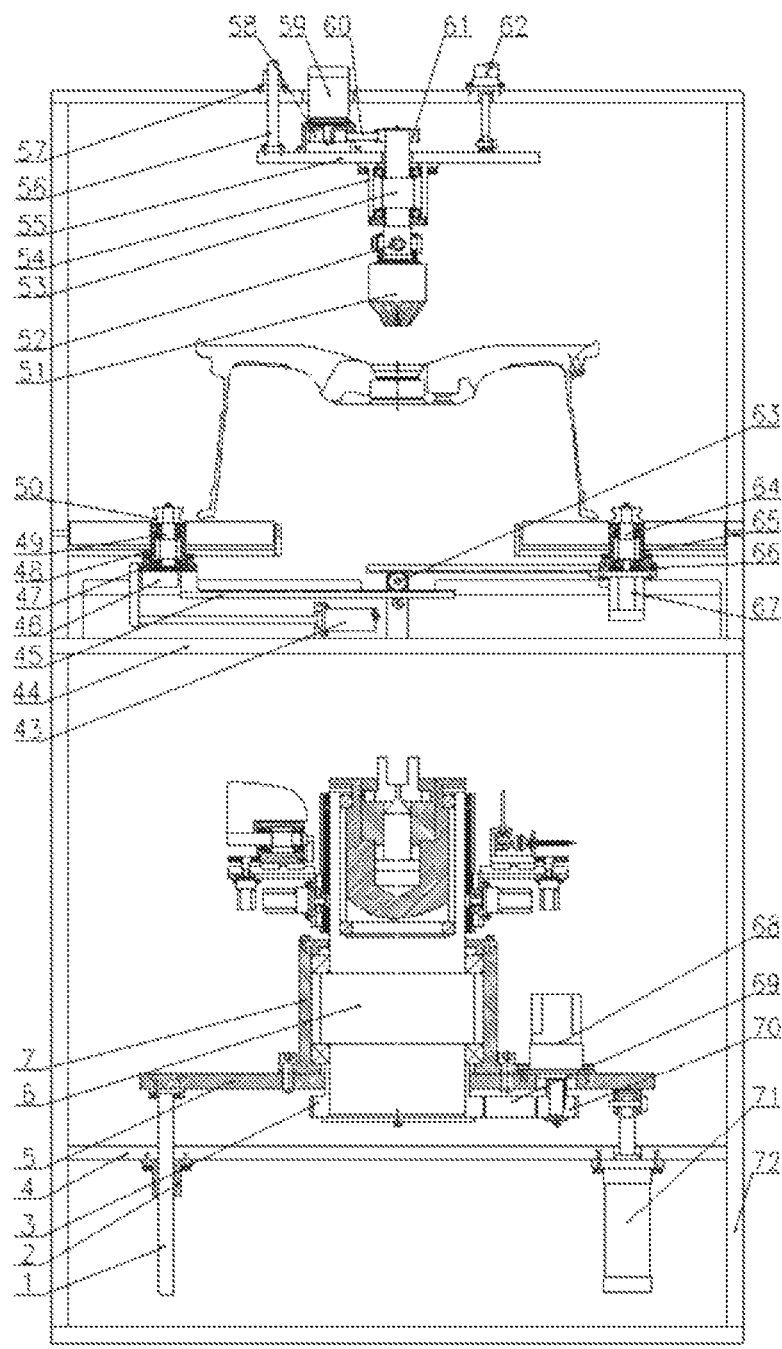
FIG. 1 is the main view of an on-line automatic detection device for wheel brake space of the present application.
Figure 2:
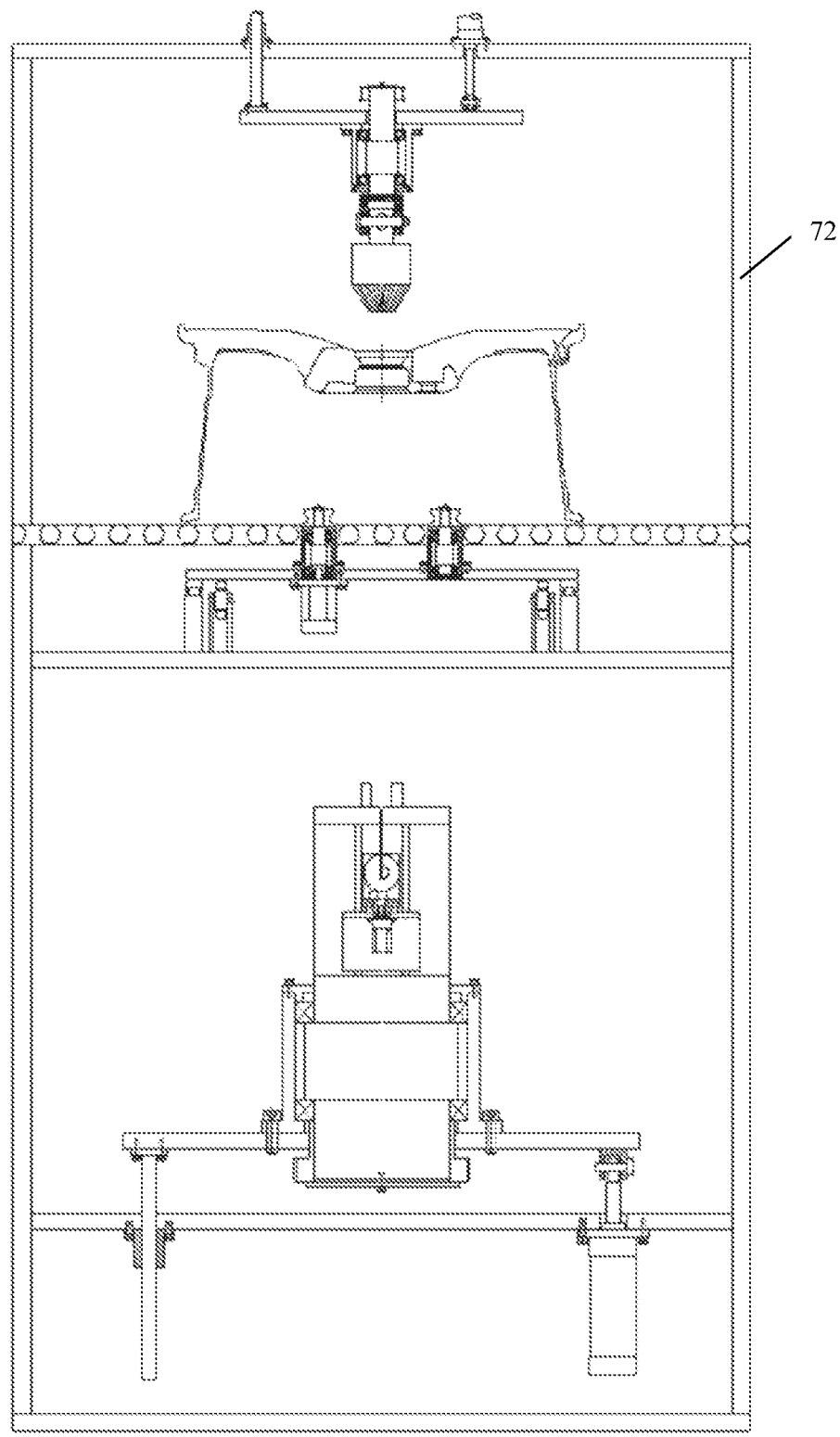
FIG. 2 is the left view of the on-line automatic detection device for wheel brake space of the present application.
Figure 3:
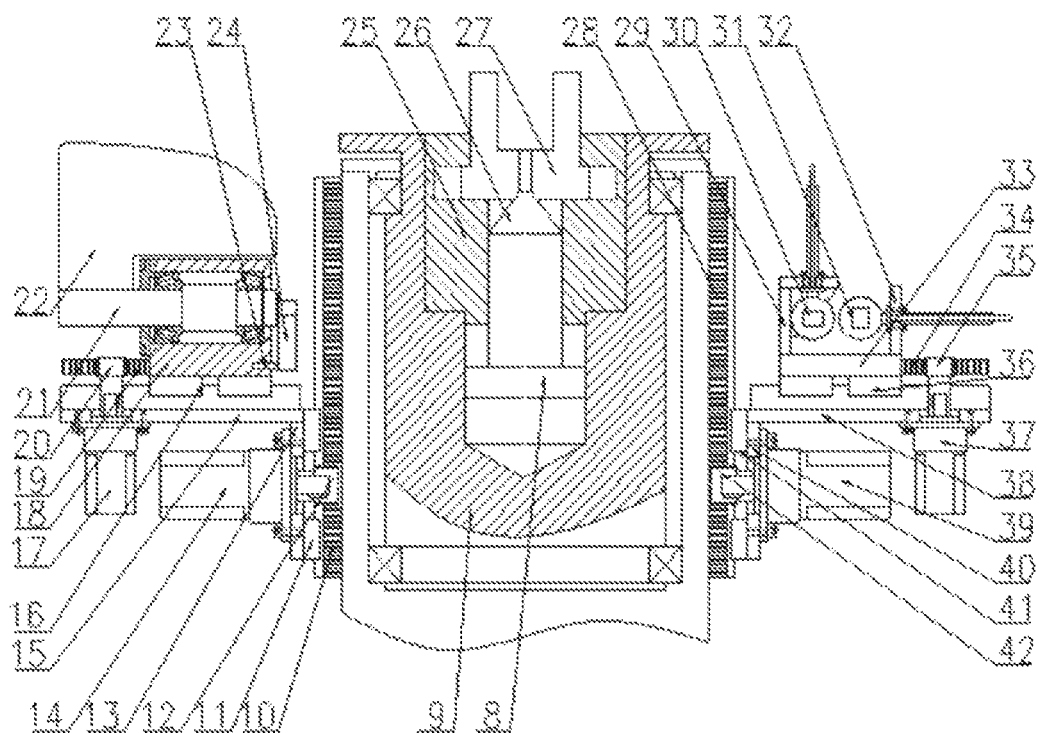
FIG. 3 is the main view of the detection system of the on-line automatic detection device for wheel brake space of the present application.

In which, 1—lower guiding pillar, 2—lower guiding sleeve, 3—first pulley, 4—lower fixing plate, 5—lower lifting plate, 6—first shaft, 7—first bearing seat, 8—piston, 9—second shaft, 10—first rack, 11—first lower guiding rail, 12—first gear, 13—left vertical plate, 14—first servo motor, 15—left transverse plate, 16—second lower guiding rail, 17—second servo motor, 18—second bearing seat, 19—second rack, 20—second gear, 21—third shaft, 22—detection plate, 23—sensor, 24—counterweight block, 25—sealing block, 26—cylinder rod, 27—expansion block, 28—third rack, 29—left bracket, 30—vertical meter, 31—transverse meter, 32—right bracket, 33—sliding plate, 34—fourth rack, 35—fourth gear, 36—third lower guiding rail, 37—third servo motor, 38—right transverse plate, 39—fourth servo motor, 40—right vertical plate, 41—fourth lower guiding rail, 42—third gear, 43—first cylinder, 44—upper fixing plate, 45—rack V, 46—upper guiding rail, 47—left sliding plate, 48—left bearing seat, 49—left shaft, 50—V type roller, 51—conical pressing head, 52—cross hinge, 53—fourth shaft, 54—third bearing seat, 55—upper lifting plate, 56—upper guiding pillar, 57—upper guiding sleeve, 58—second pulley, 59—fifth servo motor, 60—first synchronous belt, 61—third pulley, 62—second cylinder, 63—fifth gear, 64—right shaft, 65—right bearing seat, 66—right sliding plate, 67—sixth servo motor, 68—seventh servo motor, 69—second synchronous belt, 70—fourth pulley, 71—third cylinder, 72—frame.

DETAILED DESCRIPTION OF THE INVENTION

The details and operation conditions of the specific device of the present application are given below in conjunction with the illustration of the accompanying drawings.

The device includes lower guiding pillars 1, lower guiding sleeves 2, a first pulley 3, a lower fixing plate 4, a lower lifting plate 5, a first shaft 6, a first bearing seat 7, a piston 8, a second shaft 9, a first rack 10, a first lower guiding rail 11, a first gear 12, a left vertical plate 13, a first servo motor 14, a left transverse plate 15, a second lower guiding rail 16, a second servo motor 17, a second bearing seat 18, a second rack 19, a second gear 20, a third shaft 21, a detection plate 22, a sensor 23, a counterweight block 24, a sealing block 25, a cylinder rod 26, expansion blocks 27, a third rack 28, a left bracket 29, a vertical meter 30, a transverse meter 31, a right bracket 32, a sliding plate 33, a fourth rack 34, a fourth gear 35, a third lower guiding rail 36, a third servo motor 37, a right transverse plate 38, a fourth servo motor 39, a right vertical plate 40, a fourth lower guiding rail 41, a third gear 42, a first cylinder 43, an upper fixing plate 44, fifth racks 45, an upper guiding rail 46, a left sliding plate 47, left bearing seats 48, left shafts 49, V-type rollers 50, a conical pressing head 51, a cross hinge 52, a fourth shaft 53, a third bearing seat 54, an upper lifting plate 55, upper guiding pillars 56, upper guiding sleeves 57, a second pulley 58, a fifth servo motor 59, a first synchronous belt 60, a third pulley 61, a second cylinder 62, a fifth gear 63, right shafts 64, right bearing seats 65, a right sliding plate 66, a sixth servo motor 67, a seventh servo motor 68, a second synchronous belt 69, a fourth pulley 70, third cylinders 71 and a frame 72, etc.

The lower drive system includes: the four lower guiding sleeves 2 are fixed below the lower fixing plate 4; each of the four lower guiding pillars 1 matched with one of the lower guiding sleeves 2 is fixed below the lower lifting plate 5; the two third cylinders 71 are fixed below the lower fixing plate 4, output ends thereof are hinged with lower part of the lower lifting plate 5; the first bearing seat 7 is fixed above the lower lifting plate 5; the first shaft 6 is mounted inside the first bearing seat 7 through a bearing; lower part of first shaft 6 is fixed with the first pulley 3; the seventh servo motor 68 is fixed on right side above the lower lifting plate 5, and output end thereof is fixed with the fourth pulley 70; and the first pulley 3 and fourth pulley 70 are connected by the second synchronous belt 69.

The detection system includes: the second shaft 9 is mounted in a hole at upper end of first shaft 6 through a bearing; the piston 8 is matched with a hole on the second shaft 9; the cylinder rod 26 is fixed above the piston 8; upper part of the cylinder rod 26 is conical; the sealing block 25 is fixed at upper end of second shaft 9; the sealing block 25 is provided with several uniformly distributed T-type grooves; several expansion blocks 27 are matched with T-type grooves of the sealing block 25; a conical surface is formed in the middle of the several expansion blocks 27 to match with conical surface of upper part of the cylinder rod 26; the piston 8, the second shaft 9, the sealing block 25 and the cylinder rod 26 form a closed self-made cylinder; the first rack 10 is fixed on left side of the first shaft 6; the left vertical plate 13 is mounted on left side of the first shaft 6 through the first lower guiding rail 11; the first servo motor 14 is fixed on left side of the left vertical plate 13, and top end thereof is fixed with the first gear 12; the first gear 12 is meshed with the first rack 10; the left transverse plate 15 is fixed on the top of the left vertical plate 13; the second bearing seat 18 is mounted on the top of the left transverse plate 15 through the second lower guiding rail 16; the second rack 19 is fixed on left side of the second bearing seat 18; the second servo motor 17 is fixed below the left transverse plate 15, and output end thereof is fixed with the second gear 20; the second gear 20 is meshed with the second rack 19; the third shaft 21 is mounted inside the second bearing seat 18 through a bearing; the detection plate 22 is fixed on left side of the third shaft 21; the sensor 23 is fixed on right side of the second bearing seat 18; the counterweight block 24 is fixed on right side of the third shaft 21; the right vertical plate 40 is mounted on right side above the first shaft 6 through the fourth lower guiding rail 41; the third rack 28 is also fixed on right side of the first shaft 6; the fourth servo motor 39 is fixed on right side of the right vertical plate 40, and output end thereof is fixed with the third gear 42; the third gear 42 is meshed with third rack 28; the right transverse plate 38 is fixed on upper part of the right vertical plate 40; the sliding plate 33 is mounted above the right transverse plate 38 through the third lower guiding rail 36; the left bracket 29 is fixed on left side above the sliding plate 33; the vertical meter 30 is fixed on the left bracket 29; the right bracket 32 is fixed on right side above the sliding plate 33; the transverse meter 31 is fixed on the right bracket 32; the fourth rack 34 is fixed on right side of the sliding plate 33; the third servo motor 37 is fixed below the right transverse plate 38, and output end thereof is fixed with the fourth gear 35; and the fourth gear 35 is meshed with the fourth rack 34.

The synchronous clamping drive system includes: the fifth gear 63 is fixed above the upper fixing plate 44; the left sliding plate 47 is mounted above the upper fixing plate 44 through the upper guiding rail 46; the two left bearing seats 48 are fixed above the left sliding plate 47; the two left shafts 49 are mounted inside the left bearing seat 48 through bearings; the right sliding plate 66 is fixed above the upper fixing plate 44 through the upper guiding rail 46; the two right bearing seats 65 are fixed above the right sliding plate 66; the two right shafts 64 are mounted inside the right bearing seat 65 through bearings; upper parts of the two left shafts 49 and upper parts of the two right shafts 64 are fixed with one of the V-type rollers 50, respectively; the sixth servo motor 67 is fixed below the right sliding plate 66, and output end thereof is connected with lower part of one of the right shafts 64; the first cylinder 43 is fixed above the upper fixing plate 44, and output end thereof is connected with the left sliding plate 47; lower parts of the left sliding plate 47 and the right sliding plate 66 are respectively fixed with one of the fifth racks 45, and the two fifth racks 45 are meshed with the fifth gear 63 at the same time.

The upper driving and pressing system includes: the four upper guiding sleeves 57 are fixed on the top of the frame 72; the four upper guiding pillars 56 matched with the upper guiding sleeves 57 are fixed above the upper lifting plate 55; the second cylinder 62 is also fixed on the top of the frame 72, and output end thereof is hinged with the top of the upper lifting plate 55; the fifth servo motor 59 is mounted on the top of the upper lifting plate 55, and output end thereof is fixed with the second pulley 58; the third bearing seat 54 fixed below the upper lifting plate 55; the fourth shaft 53 is mounted inside the third bearing seat 54 through a bearing; the top of the fourth shaft 53 is fixed with the third pulley 61; the second pulley 58 and the third pulley 61 are connected by the first synchronous belt 60; the top of the cross hinge 52 is fixed below the fourth shaft 53; and the conical pressing head 51 is fixed below the cross hinge 52.

During operation, the first cylinder 43 makes the four V-type rollers 50 clamp the wheel synchronously through the fifth gear 63, the fifth racks 45 and the upper guiding rail 46; the sixth servo motor 67 makes the clamped wheels rotate; the third cylinder 71 makes the first shaft 6 and the expansion blocks 27 rise through the lower guiding pillars 1 and the lower guiding sleeves 2 to ensure that upper end surface of the second shaft 9 contacts with the flange disc of the wheel; the piston 8 makes the cylinder rod 26 move upward, resulting in the expansion blocks 27 expand center hole of the wheel; the first cylinder 43 makes the four V-type rollers 50 loosen the wheel through the fifth gear 63, the fifth racks 45 and the upper guiding rail 46; the third cylinder 71 continually make the wheel rise through the lower guiding pillars 1 and the lower guiding sleeves 2; and the second cylinder 62 makes the conical pressing head 51 press dead head of the wheel through the upper guiding pillars 56 and the upper guiding sleeve 57, and the wheel is fully positioned.

The first servo motor 14 precisely regulates the height of the detection plate 22 through the first gear 12, the first rack 10 and the first lower guiding rail 11; the second servo motor 17 precisely regulates the horizontal position of the detection plate 22 through the second gear 20, the second rack 19 and the second lower guiding rail 16; the seventh servo motor 68 drives the first shaft 6 to rotate through the first pulley 3, the fourth pulley 70 and the second synchronous belt 69, and also drives the detection plate 22 to rotate, so the brake space of the back cavity of the wheel may be detected at this time. When the brake space of the back cavity of the wheel is not qualified, the detection plate 22 will interfere with the back cavity of the wheel, and the detection plate 22 will rotate at a certain angle to change the position of the counterweight block 24, so that the sensor 23 will immediately detect the interference signal; on the condition the sensor 23 does not generate a signal, the brake space is qualified.

When it is detected that the brake space is unqualified, the fifth servo motor 59 rotates the fourth shaft 53 and the conical pressing head 51 through the first synchronous belt 60, and drives the wheel to rotate at the same time; the fourth servo motor 39 may accurately regulate the heights of the transverse meter 31 and the vertical meter 30 through the third gear 42, the third rack 28 and the fourth lower guiding rail 41; the third servo motor 37 may accurately regulate the horizontal positions of the transverse meter 31 and the vertical meter 30 through the fourth gear 35, the fourth rack 34 and the third lower guiding rail 36; the transverse meter 31 and the vertical meter 30 may detect the runout in the circumferential direction and in the axial direction of the wheel back cavity respectively, so that the specific value of the interference amount of the brake space may be more intuitively displayed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. On-line automatic detection device for wheel brake space comprising: lower guiding pillars, lower guiding sleeves, a first pulley, a lower fixing plate, a lower lifting plate, a first shaft, a first bearing seat, a piston, a second shaft, a first rack, a first lower guiding rail, a first gear, a left vertical plate, a first servo motor, a left transverse plate, a second lower guiding rail, a second servo motor, a second bearing seat, a second rack, a second gear, a third shaft, a detection plate, a sensor, a counterweight block, a sealing block, a cylinder rod, expansion blocks, a third rack, a left bracket, a vertical meter, a transverse meter, a right bracket, a sliding plate, a fourth rack, a fourth gear, a third lower guiding rail, a third servo motor, a right transverse plate, a fourth servo motor, a right vertical plate, a fourth lower guiding rail, a third gear, a first cylinder, an upper fixing plate, fifth racks, an upper guiding rail, a left sliding plate, left bearing seats, left shafts, V-type rollers, a conical pressing head, a cross hinge, a fourth shaft, a third bearing seat, an upper lifting plate, upper guiding pillars, upper guiding sleeves, a second pulley, a fifth servo motor, a first synchronous belt, a third pulley, a second cylinder, a fifth gear, right shafts, right bearing seats, a right sliding plate, a sixth servo motor, a seventh servo motor, a second synchronous belt, a fourth pulley, third cylinders and a frame;

the lower drive system comprises: the four lower guiding sleeves are fixed below the lower fixing plate; each of the four lower guiding pillars matched with one of the lower guiding sleeves is fixed below the lower lifting plate; the two third cylinders are fixed below the lower fixing plate, output ends thereof are hinged with lower part of the lower lifting plate; the first bearing seat is fixed above the lower lifting plate; the first shaft is mounted inside the first bearing seat through a bearing; lower part of first shaft is fixed with the first pulley; the seventh servo motor is fixed on right side above the lower lifting plate, and output end thereof is fixed with the fourth pulley; and the first pulley and fourth pulley are connected by the second synchronous belt;

the detection system comprises: the second shaft is mounted in a hole at upper end of first shaft through a bearing; the piston is matched with a hole on the second shaft; the cylinder rod is fixed above the piston; upper part of the cylinder rod is conical; the sealing block is fixed at upper end of second shaft; the sealing block is provided with several uniformly distributed T-type grooves; several expansion blocks are matched with T-type grooves of the sealing block; a conical surface is formed in the middle of the several expansion blocks to match with conical surface of upper part of the cylinder rod; the piston, the second shaft, the sealing block and the cylinder rod form a closed self-made cylinder; the first rack is fixed on left side of the first shaft; the left vertical plate is mounted on left side of the first shaft through the first lower guiding rail; the first servo motor is fixed on left side of the left vertical plate, and top end thereof is fixed with the first gear; the first gear is meshed with the first rack; the left transverse plate is fixed on the top of the left vertical plate; the second bearing seat is mounted on the top of the left transverse plate through the second lower guiding rail; the second rack is fixed on left side of the second bearing seat; the second servo motor is fixed below the left transverse plate, and output end thereof is fixed with the second gear; the second gear is meshed with the second rack; the third shaft is mounted inside of the second bearing seat through a bearing; the detection plate is fixed on left side of the third shaft; the sensor is fixed on right side of the second bearing seat; the counterweight block is fixed on right side of the third shaft; the right vertical plate is mounted on right side above the first shaft through the fourth lower guiding rail; the third rack is also fixed on right side of the first shaft; the fourth servo motor is fixed on right side of the right vertical plate, and output end thereof is fixed with the third gear; the third gear is meshed with third rack; the right transverse plate is fixed on upper part of the right vertical plate; the sliding plate is mounted above the right transverse plate through the third lower guiding rail; the left bracket is fixed on left side above the sliding plate; the vertical meter is fixed on the left bracket; the right bracket is fixed on right side above the sliding plate; the transverse meter is fixed on the right bracket; the fourth rack is fixed on right side of the sliding plate; the third servo motor is fixed below the right transverse plate, and output end thereof is fixed with the fourth gear; and the fourth gear is meshed with the fourth rack;

the synchronous clamping drive system comprises: the fifth gear is fixed above the upper fixing plate; the left sliding plate is mounted above the upper fixing plate through the upper guiding rail; the two left bearing seats are fixed above the left sliding plate; the two left shafts are mounted inside the left bearing seat through bearings; the right sliding plate is fixed above the upper fixing plate through the upper guiding rail; the two right bearing seats are fixed above the right sliding plate; the two right shafts are mounted inside the right bearing seat through bearings; upper parts of the two left shafts and upper parts of the two right shafts are fixed with one of the V-type rollers, respectively; the sixth servo motor is fixed below the right sliding plate, and output end thereof is connected with lower part of one of the right shafts; the first cylinder is fixed above the upper fixing plate, and output end thereof is connected with the left sliding plate; lower parts of the left sliding plate and the right sliding plate are respectively fixed with one of the fifth racks, and the two fifth racks are meshed with the fifth gear at the same time;

the upper driving and pressing system comprises: the four upper guiding sleeves are fixed on the top of the frame; the four upper guiding pillars matched with the upper guiding sleeves are fixed above the upper lifting plate; the second cylinder is also fixed on the top of the frame, and output end thereof is hinged with the top of the upper lifting plate; the fifth servo motor is mounted on the top of the upper lifting plate, and output end thereof is fixed with the second pulley; the third bearing seat fixed below the upper lifting plate; the fourth shaft is mounted inside the third bearing seat through a bearing; the top of the fourth shaft is fixed with the third pulley; the second pulley and the third pulley are connected by the first synchronous belt; the top of the cross hinge is fixed below the fourth shaft; and the conical pressing head is fixed below the cross hinge.

\* \* \* \* \*